(12) United States Patent
Broussard et al.

(10) Patent No.: US 7,376,220 B2
(45) Date of Patent: May 20, 2008

(54) AUTOMATICALLY UPDATING A VOICE MAIL GREETING

(75) Inventors: Scott J. Broussard, Cedar Park, TX (US); Eduardo N. Spring, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 1088 days.

(21) Appl. No.: 10/142,607

(22) Filed: May 9, 2002

(65) Prior Publication Data

US 2003/0210771 A1    Nov. 13, 2003

(51) Int. Cl.
*H04M 1/64* (2006.01)
*H04M 3/22* (2006.01)
*H04M 11/10* (2006.01)
*H04L 12/58* (2006.01)
*H04M 3/42* (2006.01)

(52) U.S. Cl. .............................. 379/88.04; 379/88.01; 379/1.02; 455/413

(58) Field of Classification Search ............. 379/88.04, 379/67.1, 68, 76, 88.17, 88.18, 88.22, 88.23, 379/88.24, 88.19, 142, 88.01, 1.02; 455/413, 455/412.1, 412.2, 414.1
See application file for complete search history.

(56) References Cited

U.S. PATENT DOCUMENTS

| | | | |
|---|---|---|---|
| 5,136,648 A | 8/1992 | Olson | |
| 5,832,062 A | 11/1998 | Drake | |
| 5,933,488 A * | 8/1999 | Marcus et al. | 379/217.01 |
| 6,067,347 A * | 5/2000 | Farris et al. | 379/88.01 |
| 6,167,119 A * | 12/2000 | Bartholomew et al. | 379/88.04 |
| 6,181,781 B1 | 1/2001 | Porter | |
| 6,212,550 B1 | 4/2001 | Segur | |
| 6,240,391 B1 * | 5/2001 | Ball et al. | 704/270 |
| 6,266,399 B1 * | 7/2001 | Weller et al. | 379/88.19 |
| 6,282,270 B1 | 8/2001 | Porter | |
| 6,289,085 B1 | 9/2001 | Miyashita | |
| 6,580,787 B1 * | 6/2003 | Akhteruzzaman et al. | 379/88.22 |
| 6,631,183 B1 * | 10/2003 | Rautila et al. | 379/88.22 |
| 6,665,379 B1 * | 12/2003 | Brown et al. | 379/88.18 |
| 6,721,415 B1 * | 4/2004 | Gilbert | 379/221.09 |
| 6,731,724 B2 * | 5/2004 | Wesemann et al. | 379/88.16 |
| 6,751,299 B1 * | 6/2004 | Brown et al. | 379/88.18 |
| 6,789,064 B2 * | 9/2004 | Koh | 704/260 |
| 7,099,656 B2 * | 8/2006 | Chefalas et al. | 455/412.1 |
| 7,242,752 B2 * | 7/2007 | Chiu | 379/88.04 |

* cited by examiner

*Primary Examiner*—Tilahun Gesesse
(74) *Attorney, Agent, or Firm*—Matthew Talpis; Jeffrey L. Streets; Streets & Steele (57) ABSTRACT

A method for preparing and automatically updating a greeting on a voice mail system comprising receiving a call to a voice mailbox, selecting a greeting template based on one or more conditions, identifying greeting parameters present within the greeting template, retrieving values for the greeting parameters, and generating a greeting using the values of the greeting parameters in accordance with the greeting template. The method allows the voice mailbox user to better manage incoming calls when the user is not available to accept them. The method further provides a benefit to the caller by providing a greeting that contains information tailored to benefit the caller, thereby helping the caller to decide, for example, whether or not to leave a voice mail message in the user's voice mailbox.

60 Claims, 5 Drawing Sheets

AUTOMATICALLY UPDATING A VOICE MAIL GREETING

BACKGROUND OF THE INVENTION

1. Field of the Invention

The present invention relates to voice mail systems and, more specifically, to a method of using a telephone voice mail system.

2. Description of the Related Art

Voice mail systems, or voice messaging systems, may be attached to a telephone network, often through a private branch exchange (PBX). These voice mail systems are used to receive and store incoming voice messages from callers whenever the intended recipient is absent or otherwise occupied. The intended recipient, or voice mail user, may then listen to the stored messages at some future time. A voice mail system is generally implemented either on special purpose computer hardware or a standard computer workstation equipped with a suitable telephony interface. Such voice mail systems are well known, such as the DirectTalk-Mail® system, available from IBM Corporation, which operates in conjunction with the Direct Talk/6000® voice processing system, also available from IBM. Other examples of voice mail systems are described in U.S. Pat. No. 5,136,648, hereby incorporated by reference.

There are commercially available products that provide links between a personal computer and a voice mail system. CallXpress 3® Desk Top for Windows, a registered trademark of Applied Voice Technology, is one example. These products provide a graphical user interface (GUI) on a personal computer that allows the user to interact with the voice mail system. For example, if a user selects a particular voice message being displayed on the personal computer's monitor, then the voice mail system will ring the user's telephone and play the selected message.

This interaction between the user, using the GUI displayed on the user's personal computer, and the voice mail system has provided greater and more flexible information interchange between the user and the voice mail system than had ever before been possible. For example, a voice mail user is no longer required to remember and perform complex instructions played over the user's telephone by the voice mail system. Instead, the information and instructions may now be conveniently displayed on the computer screen through the GUI. Likewise, user input commands to the voice mail system no longer need to be restricted to the conventional 12 touchtone (DTMF) keys on a telephone keypad, but rather can exploit the whole computer keyboard and full power of the GUI.

While advances with voice mail systems have improved the interaction between the voice mailbox user and the voice mailbox system, the caller who is being asked to leave a message does not receive much helpful information from the recorded greeting delivered to the caller. Indeed, many callers become frustrated and just hang up after receiving a greeting from a voice mail system because, for example, the callers simply cannot tell whether the person who recorded the greeting is in or out of the office on the day the caller calls. A general message of, "Please leave a message", just doesn't convey the information needed by a caller to determine whether it would be of benefit to leave a message.

Most voice mail systems provide a means for rerecording or updating the user's outgoing greeting, but the means for doing so are often so difficult and time consuming to use that many voice mailbox users rarely update their greetings. Therefore, a caller does not know whether the user will receive the caller's message or return the caller's call today or a week from today. The caller does not know whether the caller should call someone else or leave a message, because the generic greeting received from the voice mail system simply does not contain enough information.

Voice mailbox users may become easily frustrated by the complexity and the time required to update the user's message every time the user attends a meeting, takes a day off, goes on vacation, or is absent or otherwise becomes unavailable to take a phone call.

What is needed is a method that provides a voice mailbox greeting that assists the user to providing an outgoing message that helps the caller to determine whether it would be a good idea to leave a message. What is needed is a convenient method for a user to update the user's voice mailbox greeting. It would be beneficial if the greeting update could be done automatically. It would also be beneficial if the voice mailbox greeting could be selected from a plurality of greetings to provide better information to a targeted caller.

SUMMARY OF THE INVENTION

The present invention provides a method and computer program product for updating a voice mail greeting comprising receiving a call to a voice mailbox, selecting a greeting template to play based on one or more conditions, identifying greeting parameters present within a greeting template, wherein the greeting parameters are selected from user parameters, system parameters and combinations thereof, retrieving values for the greeting parameters, and generating a greeting using the values of the greeting parameters in accordance with the greeting template. The step of receiving a call to the voice mailbox further comprises attempting to connect a caller to a telephone, receiving a notice that the telephone is unanswered, switching the call to the voice mail server, and designating the user voice mailbox to receive the call. The telephone is unanswered under conditions selected from the telephone is in use, the telephone is not answered within a pre-determined number of rings, and the telephone has been set to automatically forward all telephone calls to the voice mailbox The system parameters are selected from current time, current date, dates of holidays, dates of non-business days, normal business hours, and combinations thereof. The user parameters are selected from user "in", user "out", user name, user department, transfer destination extensions for the incoming call, date out, date in, time in, time out, and combinations thereof. The user parameters and the system parameters are variables that update the voice mail greeting with current information The step of retrieving values for the greeting parameters include one or more steps selected from accessing the voice mail server for current time and date, accessing information entered into a database by the system administrator, accessing information entered into the database by the user, accessing information entered into the database by the voice mail server, and accessing a personal calendar of the user.

The step of retrieving values for greeting parameters further comprises reading the current date and time from a system clock within the voice mail server. The step of retrieving parameter values for greeting parameters further comprises reading personal calendar associated with the voice mailbox to access information selected from meeting times, vacation times, unavailable times, break times, lunch time, and combinations thereof. The greeting template comprises a mix selected from words, phrases, system parameters, user parameters, and combinations thereof.

The one or more conditions for selecting a greeting template are selected from a caller identity, date and time of call receipt, user is logged into the voice mail system, user is logged out of the voice mail system, the current date is a holiday or a non-business day, the current time is not normal business hours, an associated user calendar shows the user is away for an extended time, the associated user calendar shows the user is away for part of a day, the associated user calendar shows the user is in a meeting and combinations thereof. Each greeting template has one or more conditions that must be satisfied before the voice mail system may determine to play the greeting template. The one or more conditions are assigned to each greeting template by the user, by the system administrator, by default and by combinations thereof.

The step of selecting the greeting template to play further comprises matching a caller telephone number with a target number, wherein a caller ID identifies the caller telephone number. The user records the target number into a voice mail system database. The method further comprises providing a specific greeting template in the database for each target number and retrieving the specific greeting template associated with the target number.

The step of selecting the greeting template to play further comprises determining that the current date and time is a time selected from a holiday, a non-business day, not normal business hours, and combinations thereof, determining that the user is not signed into the voice mail system, and retrieving the greeting template provided for use during a holiday, non-business hours, a non-business day and combinations thereof.

The step of selecting the greeting template to play further comprises determining that the user is signed on to the voice mail system, and retrieving the greeting template recorded for use when the user is in.

The step of selecting the greeting template to play further comprises determining that the user is signed out of the voice mail system, determining that the outside call is from an external number, wherein a caller ID identifies the caller telephone number, and retrieving greeting templates provided for use when the user is out to an external caller.

The step of selecting the greeting template to play further comprises determining that the user is signed out of the voice mail system, determining that the outside call is from an internal number, wherein a caller ID identifies the caller telephone number, and retrieving greeting templates recorded for use when the user is out to an internal caller.

The step of selecting the greeting template to play further comprises: determining that the user is not signed in or signed out of the voice mail system, determining that an indicator shows the user is in, and retrieving the greeting template for use when the user is in.

The step of selecting the greeting template to play further comprises determining that the user is not signed in or signed out of the voice mail system, determining that indicators show the user is out, determining that the outside call is from an external number, wherein a caller ID identifies the caller telephone number, and retrieving the greeting template recorded for use when the user is out to an external call.

The step of selecting the greeting template to play further comprises determining that the user is not signed in or signed out of the voice mail system, determining that indicators show the user is out, determining that the outside call is from an internal number, wherein a caller ID identifies the caller telephone number, and retrieving the greeting template recorded for use when the user is out to an internal call. The one or more indicators are selected from the user is logged onto the computer network, the user telephone has last been used within a set period of time, the user has notified the voice mail system that the user is in, the personal calendar associated with the voice mailbox does not show the user to be out, and combinations thereof.

The step of generating the greeting further comprises playing pre-recorded voice segments and inserting the values of the parameters between the segments. The segments and the values may be pre-recorded. The segments and the values may be voice synthesized. The segments and the values may be produced by means selected from pre-recorded, voice synthesized, and combinations thereof The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

The present invention provides a method for preparing and updating a greeting on a voice mail system comprising receiving a call to a voice mailbox, selecting a greeting template based on one or more conditions, identifying greeting parameters present within the greeting template, retrieving values for the greeting parameters, and generating a greeting using the values of the greeting parameters in accordance with the greeting template. The method allows the voice mailbox user to better manage incoming calls when the user is not available to accept them, either because the telephone is in use, the user is absent from the business site, the user is absent from the office, or the user is otherwise not disposed to accept an incoming call. The method further provides a benefit to the caller by providing a greeting that contains information tailored to benefit the caller, thereby helping the caller to decide, for example, whether or not to leave a voice mail message in the user's voice mailbox.

The voice mail system may be implemented as software on a voice mail server that is attached to the telephone network, often through a PBX. When an incoming call to a user's telephone cannot be completed, the incoming call may be switched to the voice mail system and thereby processed by the voice mail server.

Each user may be assigned a separate voice mailbox within the voice mail system. The voice mail system may be considered to be a form of a database system that is based on mailboxes. Each user has an assigned voice mailbox and associated with that voice mailbox is relevant information concerning the user of that mailbox. The information may include, for example, the user's telephone extension number, a password required to access the mailbox and to retrieve messages, the number of new messages contained in the mailbox, the total number of messages contained in the mailbox, the messages that may be retrieved by the user, and a number of parameters, conditions, indicators and greeting templates that may be selected and/or provided by the user, the system administrator or the voice mail system to better control and manage the user's unanswered incoming calls in accordance with the present invention.

The parameters that may be selected by the user to help manage the user's incoming unanswered phone calls include both system parameters and user parameters. The system parameters are those that are set by the voice mail system itself or by the voice mail system administrator. The system parameters may include any relevant information that is or can be made available to the voice mail system, either directly or indirectly, such as through remote communications with a computer network. The system parameters may include, for example, the current time, the current date, dates of holidays, dates of non-business days, normal business hours, and combinations thereof. Dates of non-business days may include, for example, weekends and dates that the business is closed due to unusual circumstances, such as inclement weather. The current date and time may be read from the voice mail server system clock. The system administrator may enter dates for non-business days and holidays into the voice mail server.

User parameters may include, for example, designating that the user is "in" or "out", which may be designated by, for example, logging into or out of the voice mail system, the user's name, the user's department, transfer destination extensions for an incoming call, date out, date in, time in, time out, and combinations thereof. The user may normally assign values for the user parameters. Optionally, the voice mail server may retrieve values for some of the parameters, as well as other information, by accessing other computer programs such as, for example, the user's personal calendar.

It should be noted that each parameter and condition has a value that can be found at a location known by the voice mail server so that the server may access that location to retrieve the value, information or condition. Most of the information is stored in a database that the voice mail server, user, or system administrator updates as appropriate. For example, when the user places a phone call using the user's telephone, the voice mail server records the then-current time in the database as the time of last use of the telephone by the user.

System parameters and user parameters may be used to generate or update a greeting with current information. Greetings may be stored as greeting templates that comprise a mix of words and parameters. When the voice mail system plays a greeting template, the words are played with values for the parameters inserted into the template. For example, a greeting template may be: "Hello. Today is <current date>. I will be out of the office until <date in>." In this greeting template, the <current date> is a system parameter and the <date in> is a user parameter. It should be noted that a greeting template might consist only of words and contain no parameters.

When the greeting template is played, the caller may hear the recorded voice of the user, the recorded voice of another person, a synthesized voice or combinations thereof. The user may, for example, record the word segments of the greeting templates and record all the possible values of all the different parameters, all of which may then be stored in the database system. When a particular greeting template is to be played, the voice mail system may then retrieve the recorded word segments and the recorded parameter values for the selected template and play them in a string as a complete greeting message. Alternatively, other people may record some or all of the words, phrases, segments and parameter values to be used in the greeting templates. As a further alternative, the templates may be typed into the GUI and then a voice synthesizer may read the words and the parameter values, delivering the complete greeting in a synthesized voice. Voice synthesizer computer programs that can read messages and greetings, such as the greeting templates the user may type into a GUI and then store in the voice mail system database, are now commercially available. Examples of such programs include ViaVoice®, Websphere Voice Response®, and Websphere Voice Server®, each a registered trademark of IBM, having New York corporate offices.

The user and system administrator may set or define the user parameters and system parameters that each person is responsible for setting, preferably by using a graphical user interface (GUI) displayed on a personal computer, personal digital assistant or other similar computer device capable of communicating with the voice mail server through a computer network. An applications program residing on the user's personal computer and system administrator's personal computer may include a graphical user interface (GUI) allowing the user and system administrator to select and define the parameters, as well as receive information from the voice mail server about the status of the user's voice mailbox including, for example, the number of new messages. Alternatively, the parameters may be set through an interactive menu played by the voice mail system over the user's telephone or system administrator's telephone, allowing the user or system administrator to select options by pressing the keys on the telephone's keypad as prompted by the voice mail server.

One advantage of the present invention is that there may be a wide variety of greeting messages that may be played to a caller based upon several conditions, such as, for example, the caller's identity, the date and time that the call is received, whether the user is at the office site or away on business or vacation, whether the caller is calling from within the business's telephone network or from a telephone outside the network, whether the call is received on a holiday, non-business day or during non-business hours, whether the user is logged into or out of the voice mail system, information contained in the user's personal calendar, and combinations thereof. The present invention provides for the automated selection of a greeting template based upon these or other conditions, singularly or in combination. The negative of each of these conditions may also be a condition, i.e., not a holiday.

If the caller's identity is set as a condition for a greeting template, the voice mail system may screen incoming calls to identify particular callers by their caller ID and then play a specific greeting message template provided by the user for that caller.

When an unanswered telephone call is switched to the voice mail system, the voice mail system may identify the caller's telephone number from the caller ID information. The voice mail system may compare the caller's telephone number with a list of target telephone numbers entered into the voice mail system by the user. If the caller's telephone number matches one of the target telephone numbers entered by the user, then the voice mail system selects the greeting template indicated by the user as the greeting template to play to that particular caller.

The user may have recorded or otherwise programmed a message meant only for a caller having that target telephone number, and the voice mail server may then play that greeting for that caller. A targeted number may belong, for example, to an important business associate, to a supervisor, to a friend, or to a family member. The information in the greeting may include information that the user wishes to tell a particular person, but not tell to the general public. Furthermore, the user may mark the message to be played only between certain times on a particular day, so that stale information contained in the greeting is not passed on by mistake. The information contained in the greeting may include the time the user left the office, where the user was going after the user left the office, or how to reach the user at another telephone number or location. The greeting may also, of course, request that the caller leave a message on the voice mail system. These personalized greetings may include user parameters and systems parameters in the same manner as previously described.

If an important business associate is calling, as identified by the incoming target number, then a message may be played stating, for example, "Hello, Tom. I am unavoidably out of the office but I don't want you to think I forgot you were calling today. Please press "1" now to be transferred to my associate whom I have fully updated on your needs." If the caller presses "1", then the voice mail system may then transfer the caller to the associate at the extension number recorded by the user on the GUI that interfaces with the voice mail system.

Another set of greeting templates may exist for playing to callers who call on holidays, non-business days, or after and before normal business hours when the user is not present and the business is not open. For example, a greeting template may be, "Hello. We are closed today for the <Holiday>holiday. Please call back on <next business day>." When a call is switched to the voice mail system, the voice mail server may check the current date, and compare the date to a list of holidays entered into the system by, for example, the system administrator. Upon discovering that the current date is a holiday, the voice mail system may check to determine whether the user is logged into the voice mail system as being present, and if not, play the holiday message template after accessing and inserting the name of the holiday and determining what day will be the next business day and inserting that date into the template to be played. Greeting templates may also be available if the current date is a non-business day or the current time is not normal business hours.

Yet another set of greeting templates may be prepared for playing to callers when the user is in, but not available to take a call. A typical template may be, "Hello. Today is <current date> and I am in but not available to take your call now. Please leave a message and I will call you back after <time in>." In this case, the voice mail system may determine that the user is in because the user has logged in on the voice mail system and recorded a value for the <time in> parameter.

If the user has failed to log in on the voice mail system to show that the user is either in or out, the voice mail system may check indicators that may be used to determine whether the user is in. These indicators may be, for example, the user's telephone was last used less than a pre-determined time period ago, the user is logged into the computer network, the user's personal calendar shows the user should be in, and combinations thereof. To decide that the user is in, the voice mail system may be required to find just one of these indicators or more than one of these indicators in support of a showing that the user is in. Otherwise, if the voice mail system cannot find the required number of indicators to show that the user is in, the voice mail system determines that the user is out. If the voice mail system decides a user is in, a greeting template may then be used that might state, for example, "Hello. Today is <current date> and I am in the office today. Please leave a message and I will return your call as soon as possible." Alternatively, when the user has left no instructions for the voice mail system to follow, the voice mail system may generate a default message such as, "Joe has been away from the phone for <last use of phone delta time>—please leave a message", thereby allowing the caller to decide whether or not to leave a message for the user, based upon the length time since the user last used the telephone.

Yet another set of templates may be available for when the user is out of the office. One set of templates may be used when the user has logged out of the voice mail system, thereby indicating that the user is out. It should be noted that being logged out might not be the same as not being logged in. Being logged out may be an express indication by the user that the user is logged out until, until, for example, the end of a particular week. Therefore, if a user has not logged out, nor logged in, the voice mail system may not be able to determine simply form the logged in/logged out parameter, whether the user is in. However, if the user has logged in or out, then the user has made a definite statement as to whether he is in or out as far as the voice mail system need be concerned. Another set of templates may be used when the user has failed to log either in or out, and the indicators, as discussed above, do not indicate that the user is in. Yet another set of templates may be used when the user's personal calendar, which the voice mail system can access and read, shows that the user is out and when the user will return.

For example, if the user is leaving the office for several days and marks the user's personal calendar accordingly, the message template may be, "Hello. Today is <current date> and I am out of the office until <date in>. Please leave me a message." The voice mail system may determine that the user is out of the office by accessing and reading the user's personal calendar, select the template associated with the user being out of the office for a period of time displayed on the user's calendar, retrieve the values for the parameters from the calendar and the system clock, and then generate the greeting.

Optionally, different templates may be used based upon whether the call is initiated from within the user's telephone system or the call is initiated from outside the user's telephone system. For example, if the caller is identified, by the caller ID, as being from within the user's telephone system, probably a business associate, the user may want to provide a more detailed greeting template that provides information including, for example, when the user will be returning, and where the user is. If, however, the caller is identified, by the caller ID, as being from outside the user's telephone service, probably a member of the general public, the user may simply want to provide a greeting template that states that the user is not presently in, and to please leave a message and not provide information to the general public regarding the user's schedule of being away from home.

Figure 1:
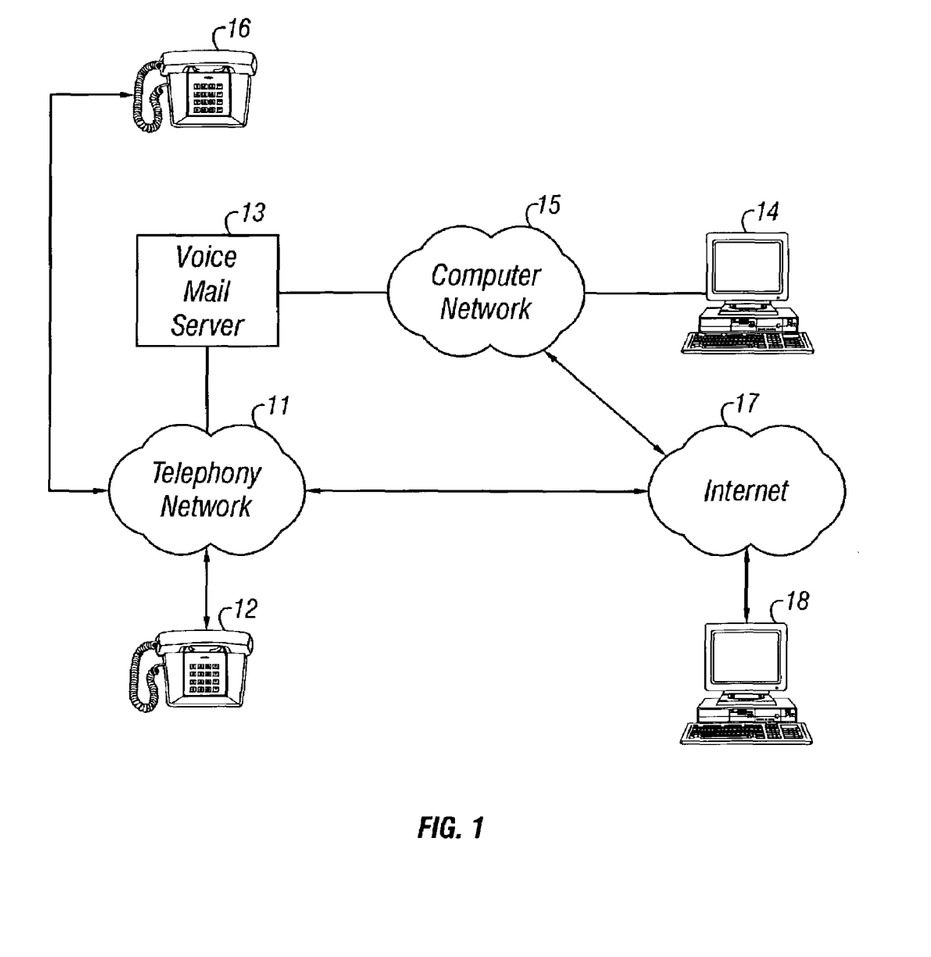
FIG. 1 is a schematic diagram showing an exemplary system in which the present invention may be implemented.

FIG. 1 is a schematic diagram showing an exemplary system in which the present invention may be implemented.

The pertinent components to the present invention include a voice mail server 13 that may record and play back messages left by an outside caller 12 when the outside caller fails to establish a connection with a telephone 16, either because the telephone 16 was busy or unanswered. The telephone 16 may go unanswered whenever, for example, the telephone's user is busy, on vacation, in a meeting or otherwise not disposed to accept a telephone call. The voice mail server 13 may also play a greeting when connected to the outside caller 12 as instructed by the telephone 16 user by, for example, asking the caller to leave a message. Instructions for the greeting format may be communicated to the voice mail server 13 through a personal computer 14. The outside telephone 12 connects to the voice mail server and to the telephone 16 through a telephone network 11. The voice mail server 13 may be connected to a personal computer 14 through a computer network 15, such as a LAN (localized area network) or WAN (wide area network). Alternatively, a computer device 18, such as another personal computer or a personal digital assistant, may be connected through a global communications network, such as the Internet 17, to the voice mail server 13 so that a telephone 16 user may instruct the voice mail server 13 to change the greeting when the user is located away from the site of the personal computer 14 or telephone 16.

Both the telephone network 11 and the computer network 15 are the media used to provide communication links between the various devices and computers interconnected within the systems. The networks 11, 15 may include permanent connections such as wire or fiber optic cables, or temporary connections made through telephones or wireless communications. Personal computers and servers may be represented by a variety of computing devices, such as mainframes, personal computers, personal digital assistants and Internet-connected cellular telephones. The networks 11, 15 may include additional servers, routers and other devices not shown.

Both systems 11, 15 are connected to the Internet 17 representing a worldwide collection of networks and gateways that use the TCP/IP suite of protocols to communicate with one another. Of course, the systems 11, 15 may also include a number of different types of networks, such as, for example, an intranet, a local area network (LAN), or a wide area network (WAN).

The present invention may be implemented in a variety of software environments. A typical operating system may be used to control program execution within the system 11, 15. The voice mail server 13 includes a conventional server software program such as IBM's Websphere®, for administering the interaction with equipment users. The server software includes application programs that enable the servers 13 to manage the voice mail database, other databases, and execute various instructions in response to communications from various voice mail system users or subscribers.

Figure 2:
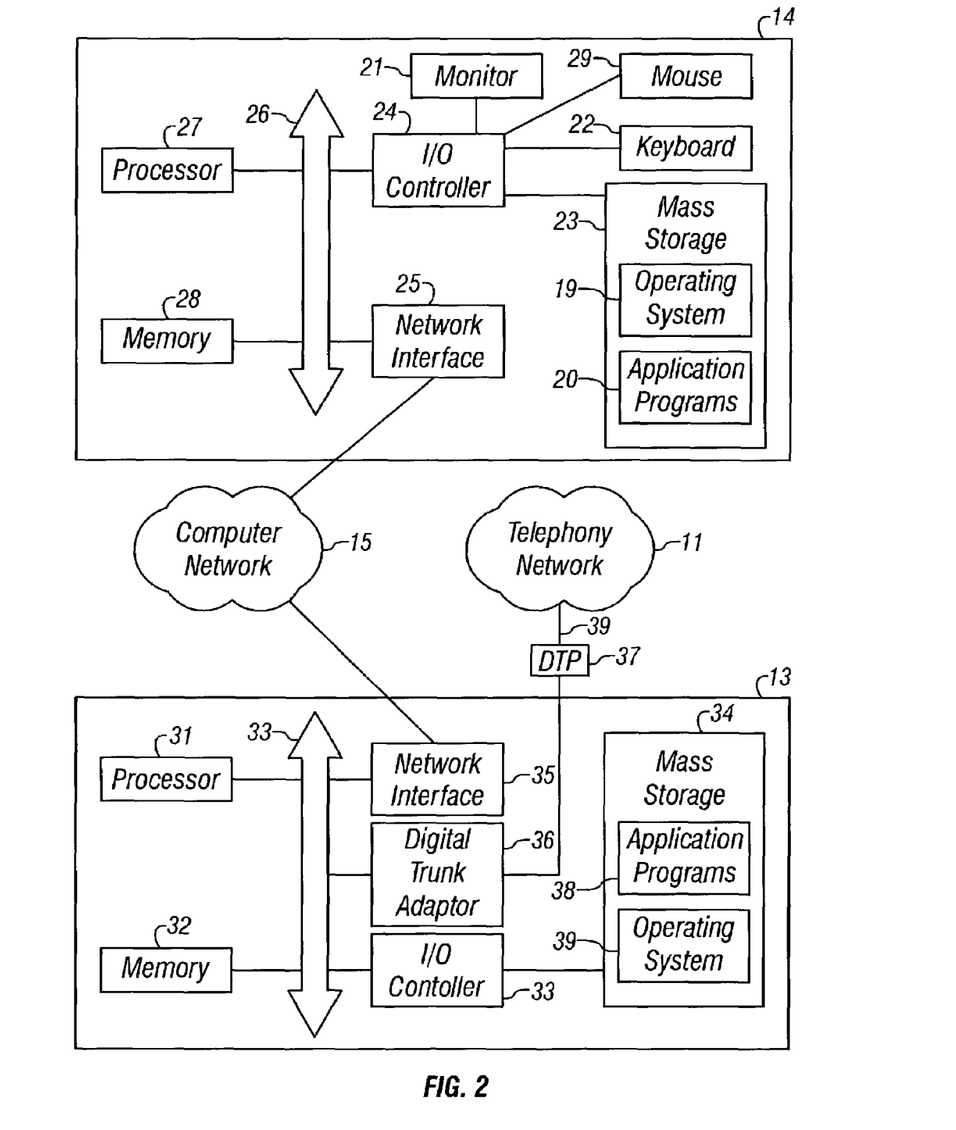
FIG. 2 illustrates an example of a computer system connected to a voice mail system.

FIG. 2 illustrates an example of a personal computer 14 connected to a voice mail server 13. In this example, the personal computer 14 is connected to the voice mail server through a computer network 15. The personal computer 14 includes conventional components such as a processor 27, memory 28 (e.g. RAM), a bus 26 that couples the processor 27 and memory 28, a mass storage device 23 (e.g. a magnetic hard disk or an optical storage disk) coupled to the processor and memory through an I/O controller 24 and a network interface 25, such as a conventional network interface card. Other conventional components connected to the I/O controller include a keyboard 22, monitor 21, and mouse 29, used for operator interface.

The voice mail server 13 also includes conventional components such as a processor 31, memory 32 (e.g. RAM), a bus 33 that couples the processor 31 and memory 32, a mass storage device 34 (e.g. a magnetic hard disk and/or an optical storage disk) coupled to the processor 31 and memory 32 through an I/O controller 33 and a network interface 35, such as a conventional network interface card. The voice mail server 13 connects to the telephone network 11 through a T1 or E1 digital trunk line 39, and via a PBX in most installations. The digital trunk processor 37 is used to demultiplex incoming signals and multiplex outgoing signals on the trunk line, and perform log-lineal conversion as appropriate. The digital trunk processor 37 is also used to perform compression/decompression. The digital trunk adapter 36 effectively acts as an interface between the voice mail server 13 and the digital trunk processor 37.

It will be appreciated from the description below that the present invention may be implemented in software that is stored as executable instructions on a computer readable medium on the computer systems, such as mass storage devices 34 and 23, respectively, or in memories 32 or 28, respectively. Application programs 38 and an operating system program 39 reside on the mass storage device 34 and are loaded into memory 32 for execution. The operating system program 39 manages the resources of the voice mail server 13. The application programs 38 are end-user programs, performing tasks as required by the computer's user. Similarly, an operating program 19 and application programs 20 reside on the mass storage device 23 of the personal computer 14.

Voice mail systems as illustrated in FIGS. 1 and 2 are well known in the art as well as many variations on the exemplary system. For example, there are systems in which the telephone line 39 is analog, in which case the digital trunk processor is often omitted, and its functions performed, where appropriate, by a suitable telephony adapter card. The precise hardware configuration employed in the voice mail system is not relevant to an understanding of the present invention, and may have wide variation.

Figure 3:
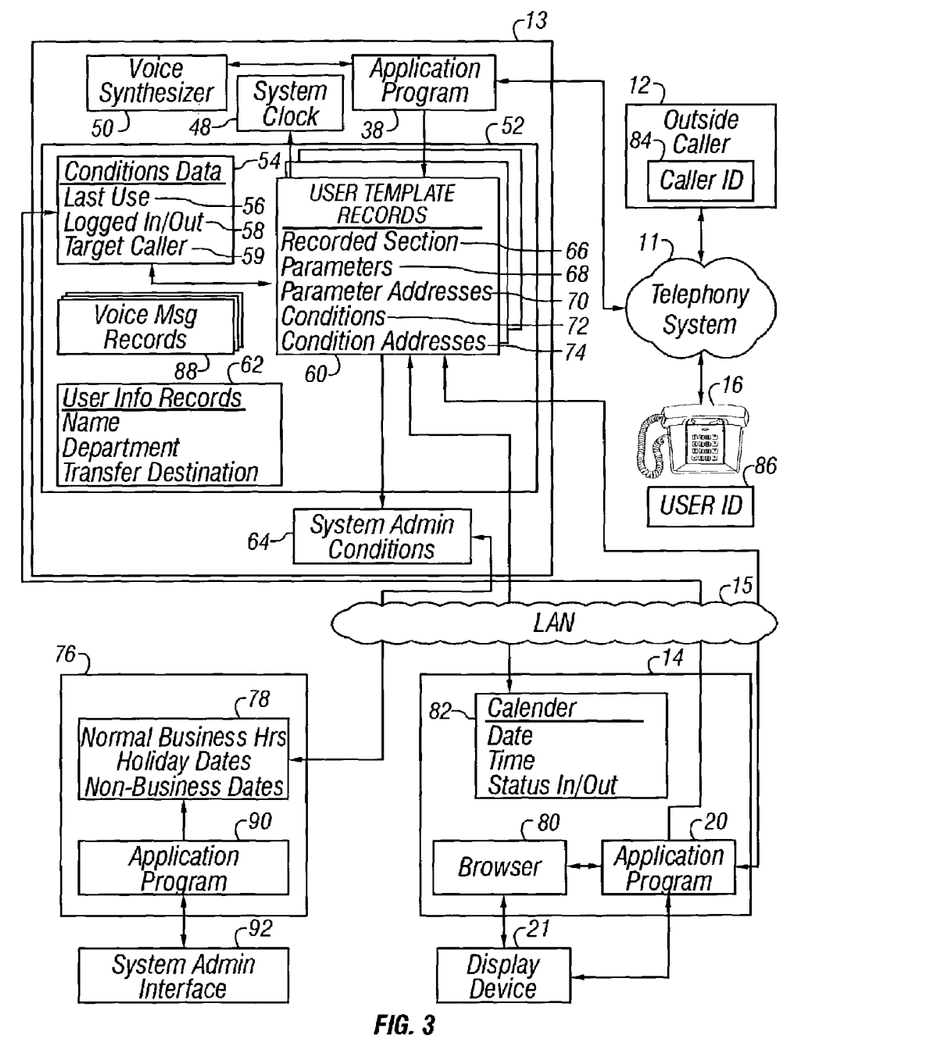
FIG. 3 is a data flow diagram in accordance with the present invention.

FIG. 3 is a data flow diagram in accordance with the present invention. An outside caller 12 attempts to connect through the telephony system 11 to a user's telephone 16. Failing to connect, the outside caller 12 is switched to the voice mail server 13 running the applications program 38. The applications program 38 reads the user's ID 86, which may be the user's telephone extension number, and the caller ID 84 of the outside caller 12, which includes the telephone number from which the outside caller is placing the call.

The applications program 38 locates the voice mailbox 52 assigned to the user's ID 86. The voice mailbox 52 may contain user information records 62 such as, for example, the user's name, department and transfer extension destinations to which calls may be forwarded when instructed. Additionally, the voice mailbox 52 may contain the voice message records 88, containing the recorded voice messages, the user template records 60, containing the greeting templates, and the conditions data 54, containing the values for conditions such as, for example, the time of last use 56 of the user's telephone, whether and/or when the user logged in or out 58 of the voice mail system, and a telephone number for a target caller 59.

The applications program 38 then locates the user template records 60 stored in the user's voice mailbox 52. Each of the user template records contains the recorded sections of the greeting 66, parameters 68 to be inserted into the greeting, a parameter address 70 for each of the parameters 68, conditions 72 and an address 74 for each of the conditions. The conditions 72 are used to determine under what circumstances a particular greeting template record 60 should be used. Conditions may be, for example, whether the date is a holiday or not, whether the user is logged in or out of the voice mail system, or whether the user is shown as being in a meeting on the user's calendar 82 kept on the user's personal computer 14. The user may set the value or status required for a condition 72 to be satisfied by communicating with the voice mail server 13 through a browser 80 installed on the user's personal computer 14. The recorded sections 66 may also be stored on the voice mail server 13 by the user typing the words that make up the recorded sections 66 into the browser 80. Then the applications program 38 may instruct the voice synthesizer 50 to convert the typed words into synthesized voice recordings that are stored as the recorded sections 66.

The applications program 38 next examines the conditions 72 for each template 60 and retrieves an actual condition status or value from the assigned address 74 for each condition 72. For example, to determine the status or value of a condition 72, the applications program 38 may retrieve the status from the user's calendar 82, or from the system administrator conditions file 64. The system administrator's conditions file 64 may be updated periodically from the system administrator's personal computer 76 also having a condition file 78. Using an interface 92, such as keyboard, mouse and monitor, the system administrator may update the conditions file 78 with information such as dates of holidays, normal business hours, and unusual closing dates, such as closing the business due to inclement weather. The applications program 90 may then periodically transfer the conditions to the conditions file 64 stored on the voice mail server 13.

After gathering the actual value or status for each of the conditions 72, the applications program 38 determines which of the user template records 60 has an exact match between the set conditions 72 entered by the user and the actual values or status of the conditions retrieved by the voice mail server 13. The user template record 60 having each condition 72 satisfied, is selected by the applications program 38 as the template greeting to play for the outside caller 12.

Using the recorded sections 66 of the selected user template record 74, the applications program 38 next directs the voice synthesizer 50 to insert the value or status for each of the parameters 68, which are retrieved from the provided parameter addresses 70. The greeting is then played for the outside caller 12.

Figure 4:
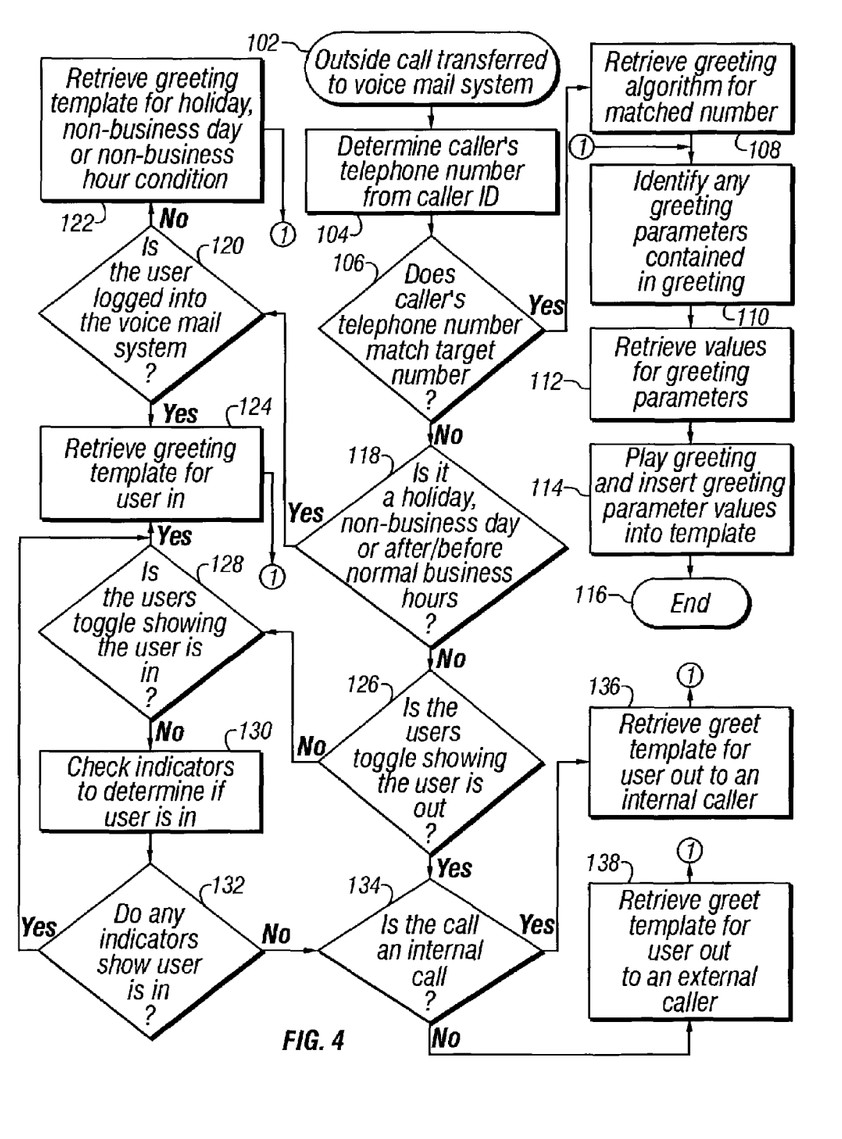
FIG. 4 is a flow chart of a method for automatically updating a voice mail greeting in accordance with the present invention.

FIG. 4 is a flow chart of a method for automatically updating a voice mail greeting in accordance with the present invention. In state 102, an outside call is transferred to the voice mail system. In state 104, the voice mail server determines the caller's telephone number from the caller ID. In state 106, the voice mail server determines whether the caller's telephone number matches any of the target telephone numbers listed by the user. If, in state 106, the caller's ID does match one of the target numbers, then in state 108, the voice mail server retrieves the greeting template associated with the caller's number. In state 110, the voice mail server identifies any parameters contained within the template and then, in state 112, retrieves the values for the parameters. In state 114, the voice mail server then plays the greeting template to the caller, inserting the retrieved parameter values in the greeting template, thereby ending the method in state 116.

If, in state 106, the caller's telephone number does not match one of the target numbers, and in state 118, the voice mail server determines that the current date and time is a holiday, a non-business day, or non-business hours, and in state 120, the user is not logged into the voice mail system, then in state 122, the voice mail server may retrieve the greeting templates designated by the user for use on holidays, nonbusiness days or during non-business hours. Then, the method continues as discussed in states 110 through 116 above.

If, in state 120, the user was logged into the voice mail system, then in state 124, the voice mail server retrieves the greeting template designated by the user for use when the user has signed in to the voice mail system. The method then continues as discussed in states 110 through 116 above.

If, in state 118, the current date and time is not a holiday, not a non-business day or is normal business hours, and in state 126, the user has not logged out of the voice mail system which would indicate that the user is out, and in state 128 the user has signed into the voice mail system indicating that the user is in, then the method continues to state 124 and then to states 110-116 as discussed above.

If, in state 126, the user has logged out of the voice mail system, and in state 134, the call has been identified from the caller ID as originating from inside the business's telephone network, then in state 136, the voice mail server retrieves greeting templates as designated by the user for use when the user is out and the call is an internal call. The method then continues to state 110 through state 116 as discussed above. If, in state 134, the call originates from outside the business's telephone network, then in state 138, the voice mail server retrieves the greeting templates designated by the user for use when the user is out and the call is an external call. The method then continues to state 110 through state 116 as discussed above.

If, in state 128, the user is not logged into the voice mail system, then in state 130, the voice mail server checks the indicators to determine if the user is in. If, in state 132 the indicators indicate the user is in, then the method continues to state 124 and then to state 110 through 116 as discussed above. If, in state 132, the indicators indicate the user is not in, the method continues from state 134 as discussed above.

Figure 5:
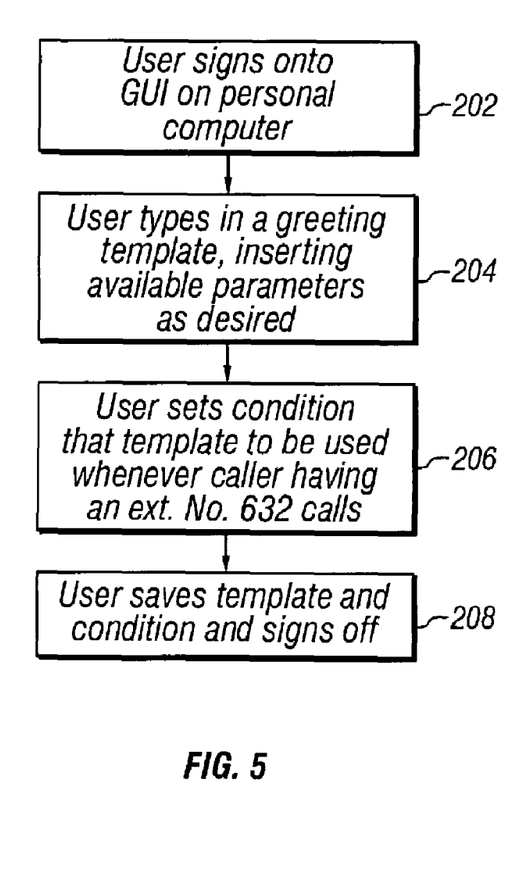
FIG. 5 is a flowchart of a method for creating a greeting template in accordance with the present invention.

FIG. 5 is a flowchart of a method for creating a greeting template in accordance with the present invention. In state 202, the user signs onto the GUI on the user's personal computer. In state 204, the user types in a greeting template, inserting available parameters as desired. In state 206, the user sets the conditions under which the voice mail server will deliver the greeting template. In this case, the condition is whenever a caller calls from a given extension number. In state 208, the user saves the template and applicable conditions and signs off. This method will be repeated as desired by the user or as allowed by system requirements to create multiple templates as described above.

Figure 6:
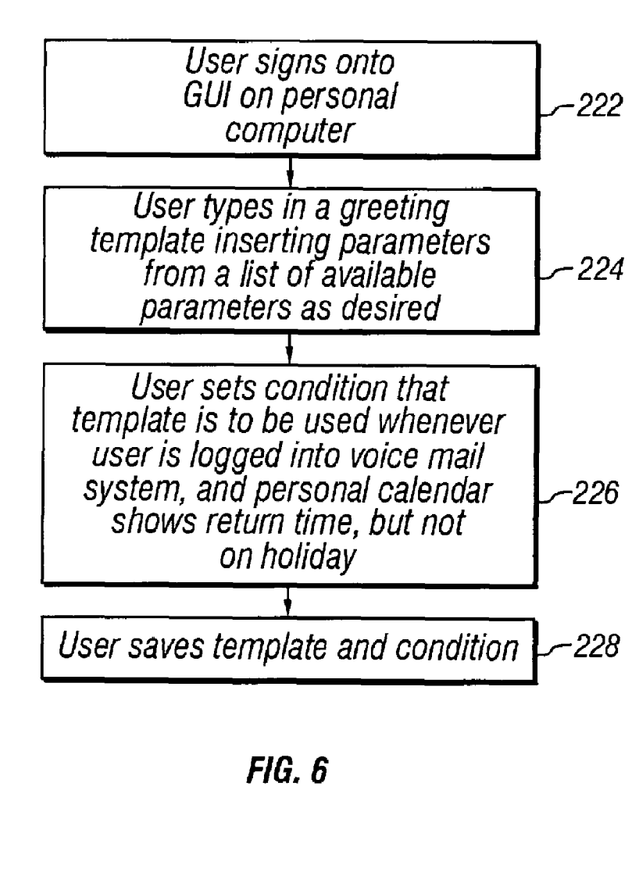
FIG. 6 is a flowchart of a method for creating a greeting template having a negative condition in accordance with the present invention.

FIG. 6 is a flowchart of a method for creating a greeting template having a negative condition in accordance with the present invention. In state 222, the user signs onto the GUI on the user's personal computer. In state 224, the user types in a greeting template, inserting available parameters as desired. In state 226, the user sets the conditions under which the voice mail server will deliver the greeting template, including a negative condition. In this case, the conditions are whenever the call is received when the user is logged into the voice mail system, and the personal calendar shows a return time, but not on a holiday. In state 228, the user saves the template and applicable conditions and signs off.

It therefore should be apparent that many greeting templates may be developed and may be played by the voice mail server whenever conditions assigned to the greeting template are met. The conditions may be set by, for example, checking a box on the GUI beside the desired available conditions of the voice mail system. Some voice mail greeting templates may be delivered under default conditions by the system when the user has not entered voice mail greeting templates covering particular conditions.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for updating a voice mail greeting in a voice mail system, comprising:
   receiving a call to a voice mailbox;
   identifying a caller telephone number using caller ID;
   automatically selecting a greeting template to play based on one or more conditions including whether the caller telephone number matches a target number in the voice mail system and whether the user is logged onto a computer network;
   identifying greeting parameters present within the greeting template, wherein the greeting parameters are selected from user parameters, system parameters and combinations thereof;
   retrieving values for the greeting parameters; and
   generating a greeting using the values of the greeting parameters in accordance with the greeting template.

2. The method of claim 1, wherein the step of receiving a call to the voice mailbox further comprises:
   attempting to connect a caller to a telephone;
   receiving a notice that the telephone is unanswered;
   switching the call to the voice mail server; and
   designating the user voice mailbox to receive the call.

3. The method of claim 2, wherein the telephone is unanswered under conditions selected from the telephone is in use, the telephone is not answered within a pre-determined number of rings, and the telephone has been set to automatically forward all telephone calls to the voice mailbox.

4. The method of claim 1, wherein the system parameters are selected from current time, current date, dates of holidays, dates of non-business days, normal business hours, and combinations thereof.

5. The method of claim 1, wherein the user parameters are selected from user "in", user "out", user name, user department, transfer destination extensions for the incoming call, date out, date in, time in, time out, and combinations thereof.

6. The method of claim 1, wherein the user parameters and the system parameters are variables that update the voice mail greeting with current information.

7. The method of claim 1, wherein the step of retrieving values for the greeting parameters include one or more steps selected from:
   accessing the voice mail server for current time and date;
   accessing information entered into a database by the system administrator;
   accessing information entered into the database by the user;
   accessing information entered into the database by the voice mail server; and
   accessing a personal calendar of the user.

8. The method of claim 1, wherein the step of retrieving values for greeting parameters further comprises:
   reading the current date and time from a system clock within the voice mail server.

9. The method of claim 1, wherein the step of retrieving parameter values for greeting parameters further comprises:
   reading a personal calendar associated with the voice mailbox to access information selected from meeting times, vacation times, unavailable times, break times, lunch time, and combinations thereof.

10. The method of claim 1, wherein the greeting template comprises a mix selected from words, phrases, system parameters, user parameters, and combinations thereof.

11. The method of claim 1, wherein the one or more conditions for selecting a greeting template further include a condition selected from date and time of call receipt, user is logged into the voice mail system, user is logged out of the voice mail system, the current date is a holiday or a non-business day, the current time is not normal business hours, an associated user calendar shows the user is away for an extended time, the associated user calendar shows the user is away for part of a day, the associated user calendar shows the user is in a meeting and combinations thereof.

12. The method of claim 1, wherein each greeting template has a target number that must be satisfied before the voice mail system may determine to play the greeting template.

13. The method of claim 12, wherein a target number is assigned to each greeting template by a person selected from the group consisting of the user, the system administrator, and combinations thereof.

14. The method of claim 1, wherein the user enters the target number into a voice mail system database.

15. The method of claim 14, further comprising:
   providing a specific greeting template in the database for each target number, wherein the selected greeting is the specific greeting template associated with the target number.

16. The method of claim 1, wherein the step of selecting the greeting template to play further comprises:
   determining that the current date and time is a time selected from a holiday, a non-business day, not normal business hours, and combinations thereof;
   determining that the user is not signed into the voice mail system; and
   retrieving a greeting template provided for use during a holiday, non-business hours, a non-business day and combinations thereof.

17. The method of claim 1, wherein the step of selecting the greeting template to play further comprises:
   determining that the user is signed on to the voice mail system; and
   retrieving a greeting template for use when the user is in.

18. The method of claim 1, wherein the step of selecting the greeting template to play further comprises:
   determining that the user is signed out of the voice mail system;
   determining that the call is from an external number, wherein a caller ID identifies the caller telephone number; and
   retrieving a greeting template provided for use when the user is out to an external caller.

19. The method of claim 1, wherein the step of selecting the greeting template to play further comprises:
   determining that the user is signed out of the voice mail system;

determining that the call is from an internal number, wherein a caller ID identifies the caller telephone number; and retrieving a greeting template for use when the user is out to an internal caller.

20. The method of claim 1, wherein the step of selecting the greeting template to play further comprises:
determining that the user is not signed in or signed out of the voice mail system;
determining that an indicator shows the user is in; and
retrieving a greeting template for use when the user is in.

21. The method of claim 1, wherein the step of selecting the greeting template to play further comprises:
determining that the user is not signed in or signed out of the voice mail system;
determining that indicators show the user is out;
determining that the call is from an external number, wherein a caller ID identifies the caller telephone number; and
retrieving a greeting template for use when the user is out to an external call.

22. The method of claim 1, wherein the step of selecting the greeting template to play further comprises:
determining that the user is not signed in or signed out of the voice mail system;
determining that indicators show the user is out;
determining that the call is from an internal number, wherein a caller ID identifies the caller telephone number; and
retrieving a greeting template for use when the user is out to an internal call.

23. The method of claim 1, wherein the step of generating the greeting further comprises:
playing pre-recorded voice segments; and
inserting the values of the parameters between the segments.

24. The method of claim 23, wherein the segments and the values are pre-recorded.

25. The method of claim 23, wherein the segments and the values are voice synthesized.

26. The method of claim 23, wherein the segments and the values are produced by means selected from pre-recorded, voice synthesized, and combinations thereof.

27. The method of claim 1, further comprising:
transferring the call to an extension recorded by the user if the caller enters a predefined keystroke identified in the greeting.

28. A computer program product including computer usable instructions embodied on a computer readable medium for updating a voice mail greeting in a voice mail system, comprising:
receiving instructions for receiving a call to a voice mailbox;
caller identifying instructions for identifying a caller telephone number using caller ID;
selecting instructions for selecting a greeting template to play based on one or more conditions including whether the caller telephone number matches a target number in the voice mail system and whether the user is logged onto a computer network;
identifying instructions for identifying greeting parameters present within the greeting template, wherein the greeting parameters are selected from user parameters, system parameters and combinations thereof;
retrieving instructions for retrieving values for the greeting parameters; and
generating instructions for generating a greeting using the values of the greeting parameters in accordance with the greeting template.

29. The computer program product of claim 28, wherein the receiving instructions for receiving a call to the voice mailbox further comprises:
receiving instructions for receiving a notice that the telephone is unanswered;
switching instructions for switching the call to the voice mail server; and
designating instructions for designating the user voice mailbox to receive the call.

30. The computer program product of claim 29, wherein the telephone is unanswered under conditions selected from the telephone is in use, the telephone is not answered within a pre-determined number of rings, and the telephone has been set to automatically forward all telephone calls to the voice mailbox.

31. The computer program product of claim 28, wherein the system parameters are selected from current time, current date, dates of holidays, dates of non-business days, normal business hours, and combinations thereof.

32. The computer program product of claim 28, wherein the user parameters are selected from user "in", user "out", user name, user department, transfer destination extensions for the incoming call, date out, date in, time in, time out, and combinations thereof.

33. The computer program product of claim 28, wherein the user parameters and the system parameters are variables that update the voice mail greeting with current information.

34. The computer program product of claim 28, wherein the retrieving instructions for retrieving values for the greeting parameters include one or more steps selected from:
accessing instructions for accessing the voice mail server for current time and date;
accessing instructions for accessing information entered into a database by the system administrator;
accessing instructions for accessing information entered into the database by the user;
accessing instructions for accessing information entered into the database by the voice mail server; and
accessing instructions for accessing a personal calendar of the user.

35. The computer program product of claim 28, wherein the retrieving instructions for retrieving values for greeting parameters further comprises:
reading instructions for reading the current date and time from a system clock within the voice mail server.

36. The computer program product of claim 28, wherein the retrieving instructions for retrieving parameter values for greeting parameters further comprises:
reading instructions for reading personal calendar associated with the voice mailbox to access information selected from meeting times, vacation times, unavailable times, break times, lunch time, and combinations thereof.

37. The computer program product of claim 28, wherein the greeting template comprises a mix selected from words, phrases, system parameters, user parameters, and combinations thereof.

38. The computer program product of claim 28, wherein the one or more conditions for selecting a greeting template further include a condition selected from date and time of call receipt, user is logged into the voice mail system, user is logged out of the voice mail system, the current date is a holiday or a non-business day, the current time is not normal business hours, an associated user calendar shows the user is away for an extended time, the associated user calendar shows the user is away for part of a day, the associated user calendar shows the user is in a meeting and combinations thereof.

39. The computer program product of claim 28, wherein each greeting template has one or more conditions that must be satisfied before the voice mail system may determine to play the greeting template.

40. The computer program product of claim 39, wherein the one or more conditions are assigned to each greeting template by the user, by the system administrator, by default and by combinations thereof.

41. The computer program product of claim 28, wherein the user enters the target number into a voice mail system database.

42. The computer program product of claim 41, further comprising:
   providing instructions for providing a specific greeting template in the database for each target number; and
   retrieving instructions for retrieving the specific greeting template associated with the target number.

43. The computer program product of claim 28, wherein the selecting instructions for selecting the greeting template to play further comprises:
   determining instructions for determining that the current date and time is a time selected from a holiday, a non-business day, not normal business hours, and combinations thereof;
   determining instructions for determining that the user is not signed into the voice mail system; and
   retrieving instructions for retrieving a greeting template provided for use during a holiday, non-business hours, a non-business day and combinations thereof.

44. The computer program product of claim 28, wherein the selecting instructions for selecting the greeting template to play further comprises:
   determining instructions for determining that the user is signed on to the voice mail system; and
   retrieving instructions for retrieving a greeting template for use when the user is in.

45. The computer program product of claim 28, wherein the selecting instructions for selecting the greeting template to play further comprises:
   determining instructions for determining that the user is signed out of the voice mail system;
   determining instructions for determining that the call is from an external number, wherein a caller ID identifies the caller telephone number; and
   retrieving instructions for retrieving a greeting template provided for use when the user is out to an external caller.

46. The computer program product of claim 28, wherein the selecting instructions for selecting the greeting template to play further comprises:
   determining instructions for determining that the user is signed out of the voice mail system;
   determining instructions for determining that the call is from an internal number, wherein a caller ID identifies the caller telephone number; and
   retrieving instructions for retrieving a greeting template for use when the user is out to an internal caller.

47. The computer program product of claim 28, wherein the selecting instructions for selecting the greeting template to play further comprises:
   determining instructions for determining that the user is not signed in or signed of the voice mail system;
   determining instructions for determining that an indicator shows the user is in; and
   retrieving instructions for retrieving a greeting template for use when the user is in.

48. The computer program product of claim 28, wherein the selecting instructions for selecting the greeting template to play further comprises:
   determining instructions for determining that the user is not signed in or signed out of the voice mail system;
   determining instructions for determining that indicators show the user is out;
   determining instructions for determining that the call is from an external number, wherein a caller ID identifies the caller telephone number; and
   retrieving instructions for retrieving a greeting template for use when the user is out to an external call.

49. The computer program product of claim 28, wherein the selecting instructions for selecting the greeting template to play further comprises:
   determining instructions for determining that the user is not signed in or signed out of the voice mail system;
   determining instructions for determining that indicators show the user is out;
   determining instructions for determining that the call is from an internal number, wherein a caller ID identifies the caller telephone number; and
   retrieving instructions for retrieving a greeting template for use when the user is out to an internal call.

50. The computer program product of claim 28, wherein the generating instructions for generating the greeting further comprises:
   playing instructions for playing pre-recorded voice segments; and
   inserting instructions for inserting the values of the parameters between the segments.

51. The computer program product of claim 50, wherein the segments and the values are pre-recorded.

52. The computer program product of claim 50, wherein the segments and the values are voice synthesized.

53. The computer program product of claim 50, wherein the segments and the values are produced by means selected from pre-recorded, voice synthesized, and combinations thereof.

54. The computer product of claim 50, further comprising voice synthesizing instructions for voice synthesizing the segments and the values.

55. The computer program product of claim 28, farther comprising:
   transferring instructions for transferring the call to an extension recorded by the user if the caller enters a predefined keystroke identified in the greeting.

56. A system for updating a voice mail greeting in a voice mail system, comprising:
   means for receiving a call to a voice mailbox;
   means for identifying a caller telephone number using caller ID;
   means for automatically_selecting a greeting template to play based on one or more conditions_including whether the caller telephone number matches a target number in the voice mail system and whether the user is logged onto a computer network;
   means for identifying greeting parameters present within the greeting template, wherein the greeting parameters are selected from user parameters, system parameters and combinations thereof;
   means for retrieving values for the greeting parameters; and means for generating a greeting using the values of the greeting parameters in accordance with the greeting template.

57. The system of claim 56, wherein the step of receiving a call to the voice mailbox further comprises:
means for receiving a notice that the telephone is unanswered;
means for switching the call to the voice mail server; and
means for designating the user voice mailbox to receive the call.

58. The system of claim 57, wherein the telephone is unanswered under conditions selected from the telephone is in use, the telephone is not answered within a pre-determined number of rings, and the telephone has been set to automatically forward all telephone calls to the voice mailbox.

59. The system of claim 56, wherein the step of retrieving values for the greeting parameters include one or more steps selected from:

means for accessing the voice mail server for current time and date;

means for accessing information entered into a database by the system administrator;

means for accessing information entered into the database by the user;

means for accessing information entered into the database by the voice mail server; and means for accessing a personal calendar of the user.

60. The system of claim 56, further comprising:

means for transferring the call to an extension recorded by the user if the caller enters a predefined keystroke identified in the greeting.

* * * * *